(12) United States Patent
Liano et al.

(10) Patent No.: US 8,452,719 B2
(45) Date of Patent: May 28, 2013

(54) EXTRAPOLATING EMPIRICAL MODELS FOR CONTROL, PREDICTION, AND OPTIMIZATION APPLICATIONS

(75) Inventors: Kadir Liano, Pflugerville, TX (US); Bijan Sayyarrodsari, Austin, TX (US); Carl Anthony Schweiger, Round Rock, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 381 days.

(21) Appl. No.: 12/825,706

(22) Filed: Jun. 29, 2010

(65) Prior Publication Data

US 2011/0320386 A1    Dec. 29, 2011

(51) Int. Cl.
*G06F 15/18* (2006.01)
*G06F 17/10* (2006.01)
*G05B 13/02* (2006.01)

(52) U.S. Cl.
USPC .................................. 706/12; 703/2; 700/30

(58) Field of Classification Search
None
See application file for complete search history.

(56) References Cited

U.S. PATENT DOCUMENTS

| | | | |
|---|---|---|---|
| 7,058,617 | B1 | 6/2006 | Hartman et al. |
| 7,213,006 | B2 | 5/2007 | Hartman et al. |
| 7,315,846 | B2 | 1/2008 | Hartman et al. |
| 7,330,804 | B2 | 2/2008 | Turner et al. |
| 7,599,897 | B2 | 10/2009 | Hartman et al. |
| 2008/0071394 | A1* | 3/2008 | Turner et al. ................. 700/31 |
| 2011/0010138 | A1* | 1/2011 | Cheng et al. ................. 703/2 |

OTHER PUBLICATIONS

Engelbrecht, Automatic Scaling Using Gamma Learning for Feedfoward Neural Networks, 1994.*
Rumelhart, D., et al.; "Learning Internal Representations by Back-Propagating Errors," Nature,1986, pp. 323:533-536.
Hornik, K.; "Approximation Capabilities of Multilayer Feedforward Networks," Neural Networks, 1991, vol. 4, pp. 251-257.
Leshno, M., et al.; "Multilayer Feedforward Networks with a NonPolynomial Activation Function Can Approximate Any Function," Neural Networks, 1993, vol. 6, pp. 861-867.
Duch, W., et al.; "Survey of Neural Transfer Functions," Neural Computing Surveys, 1999, vol. 2, pp. 163-212.
Peng, Hanchuan et al.; "A Semi-Parametric Hybrid Neural Model for Nonlinear Blind Signal Separation," International Journal of Neural Systems, Apr. 2000, vol. 10, No. 2, pp. 79-93.
Mayer, Helmut A., et al.; "Simultaneous Evolution of Structure and Activation Function Types in Generalized Multi-Layer Preceptrons," 2001 WSES International Conference on Neural Networks and Applications, Feb. 2001.
Suykens, J.; "Nonlinear Modelling and Support Vector Machines," IEEE Instrumentation and Measurement Technolgy Conference, May 2001, pp. 287-294.

(Continued)

*Primary Examiner* — Jeffrey A Gaffin
*Assistant Examiner* — Mikayla Chubb
(74) *Attorney, Agent, or Firm* — Fletcher Yoder, P.C.; Willilam R. Walbrunn; John M. Miller

(57) ABSTRACT

The present disclosure provides novel techniques for defining empirical models having control, prediction, and optimization modalities. The empirical models may include neural networks and support vector machines. The empirical models may include asymptotic analysis as part of the model definition as allow the models to achieve enhanced results, including enhanced high-order behaviors. The high-order behaviors may exhibit gains that are non-zero trending, which may be useful for controller modalities.

20 Claims, 7 Drawing Sheets

OTHER PUBLICATIONS

Hammer, B., et al.; "A Tutorial on Universal Approximation Capability of Support Vector Machines," Neural Processing Letters, Feb. 2003, vol. 17, pp. 43-53.

Smola, A., et al.; "A Tutorial on Support Vector Regression," Statistics and Computing, Aug. 2004, vol. 14, pp. 199-222.

Turner, P., et al.; "Introducing the Bounded Derivative Network—Superceding the Application of Neural Networks in Control," Journal of Process Control, 2005, pp. 407-415.

Onder-Efe, M.; "Novel Neuronal Activation Functions for Feedforward Neural Networks," Neural Process Lett, 2008, pp. 63-79.

* cited by examiner

EXTRAPOLATING EMPIRICAL MODELS FOR CONTROL, PREDICTION, AND OPTIMIZATION APPLICATIONS

BACKGROUND

The present disclosure relates generally to control systems, predictive systems, and optimization systems that utilize empirical models.

Empirical models are typically used in the modeling of complex processes, including control systems, predictive systems and optimization systems. During empirical modeling, historical data may be used as training data that aids in defining the empirical model. The trained empirical model, for example, embodied in a controller, may then present relatively accurate results within the range of the training data. However, when the trained model encounters inputs outside of the training range, the extrapolated results may not be as accurate. Further, other properties of the training data, such as quality of the data fit, may not be sufficient to render the empirical model useful.

BRIEF DESCRIPTION

The present disclosure provides novel techniques for defining controllers, predictive systems, and/or optimization systems by utilizing empirical models that are capable of incorporating desired extrapolation properties, such as a candidate basis/kernel function $\phi_b(\bullet)$, as factors used to determine the structure of the empirical model. Once the model has been defined, the model may then be utilized in controller embodiments, model predictive control embodiments, environmental management embodiments, production performance management embodiments, plant operations optimization embodiments, industrial scheduling systems embodiments, and so forth.

An empirical model may be first defined using the following general equation:

$$f(x) = \sum_{b}^{N_B} \varphi_b(w_b, x) \quad (1)$$

where $x \in \mathbb{R}^{N_u}$ is the $N_u$-dimensional input vector, $f(\bullet): \mathbb{R}^{N_u} \to \mathbb{R}^{N_y}$ is a linear or nonlinear mapping from the $N_u$-dimensional input space to $N_y$-dimensional output space, $w_b$ is the parameters of the basis/kernel function $\phi_b(\bullet)$ that are determined in the course of the modeling process, and $N_B$ is the number of the basis/kernel functions used for the approximation. Accordingly, the model is capable of utilizing a set of inputs, processing the inputs through a set of basis/kernel functions $\phi_b(\bullet)$, so as to arrive at a result. The model may be incorporated into various systems, such as control systems, predictive systems, optimization systems, or a combination thereof. The model results may thus be used, for example, as controller setpoints, predictive finish times of industrial processes, optimization of production line quality, and so forth.

In one example, a method of empirical modeling includes determining the model parameters $w_b$ given the obtainable data. The empirical model may then be further defined by the use of training data. That is, the obtainable data may be split into a training data subset and a test data subset. A training process may then be employed where the training data is presented as inputs to the model, and the model output compared to desired results. Any errors in the output may then be used to adjust the parameters (e.g., weights, biases, or tuning parameters) of the model until the model generates valid results within a certain margin of error. The test dataset may then be used as inputs to verify and validate the model. For example, the test dataset may be used as inputs into the model and the results then verified as suitable for use in production environment. Based on the quality and on the range of the training data, such an approach may be useful. However, in many instances it is difficult for the model to extrapolate outside of the training data. Accordingly, the extrapolation property of the model may be as important as the model's accuracy over the training dataset. Indeed, even if the resulting model exhibits a good quality of fit (i.e., high fidelity) over the training data set, this model property by itself may not be sufficient to render the model useful.

For example, when the model is used in industrial control, the gain of the model (e.g., the first order derivative of the output with respect to the input) may trend towards zero, especially in extrapolation regions. Zero model gains may result in infinite controller gains, which may not be useful in industrial applications. The extrapolation regions of the empirical model may also be susceptible to gain inversion. Model gain inversion may result, for example, in valves opening when they should be closing (and vice versa). Accordingly, in certain embodiments described in more detail herein, the empirical modeling process is altered by making the analysis of the extrapolation properties of the empirical model an integral part of the selection of the basis/kernel function $\phi_b(\bullet)$. That is, the basis/kernel function $\phi_b(\bullet)$ will be added to the model only if the asymptomatic behavior of the approximate function can emulate the known and/or the desired asymptomatic behavior of the actual system that is described by $f(x)$. More specifically, while the detailed behavior of the system $f(x)$ may not be known, the information on asymptotic behavior of the system may be available. By incorporating the system's asymptotic information, the resultant empirical model may be capable of a superior extrapolation behavior. Some example asymptotic behaviors may be as follows:

$$\lim_{x \to \infty} f(x) = l^{\infty}(x); \quad (2)$$

$$\lim_{x \to -\infty} f(x) = l^{-\infty}(x); \quad (3)$$

$$\lim_{x \to \infty} \frac{\delta^2 f_l}{\delta x_i \delta x_j}(x) = l^2_{ij,l}(x); \quad (4)$$

$$\lim_{x \to \infty} \frac{\delta f_j}{\delta x_i}(x) = l^1_{ij}(x). \quad (5)$$

Where $x \to \infty$ is used as a shorthand notation to denote various ways by which the asymptotic behavior of the system may be manifested. For example, a trend towards infinity may be described as $x_i \to \infty$ for all $i \in \{1, \ldots, N_u\}$. Another example may be when all of the inputs of the input vector (or set) x are constant except for the j-th component such that $x_j \to \infty$. For the examples cited in equations 2-5 above, the asymptotic behavior could assume the following forms. $l^{\infty}(x)$ is the asymptotic behavior of f(x) as all components of the input vector x grow towards $+\infty$. One example includes a constant, $l^{\infty}(x) = C$. A second example includes a linear function of inputs $l^{\infty}(x) = a \cdot x$. In these examples, C and a are known constants. $l^{-\infty}(x)$ is the asymptotic behavior of f(x) as all elements of x go to $-\infty$. $l_{ij}^1(x)$ is the asymptotic behavior of the gain from the i-th input to the j-th output as the i-th component of the input vector x grows towards +∞ while all other components of the input vector are kept constant. $l_{ij,I}^2(x)$ is the asymptotic behavior of the partial derivative of $$\frac{\delta f_i}{\delta x_j}$$

with respect to the i-th input $x_i$, as $x_I$ and $x_j$ go to ∞. It is to be understood that in other examples, other asymptotic behaviors could be used. Indeed, any number and type of asymptotic behaviors are capable of being used with the techniques described in further detail below.

DRAWINGS

These and other features, aspects, and advantages of the present invention will become better understood when the following detailed description is read with reference to the accompanying drawings in which like characters represent like parts throughout the drawings, wherein.

Figure 3:
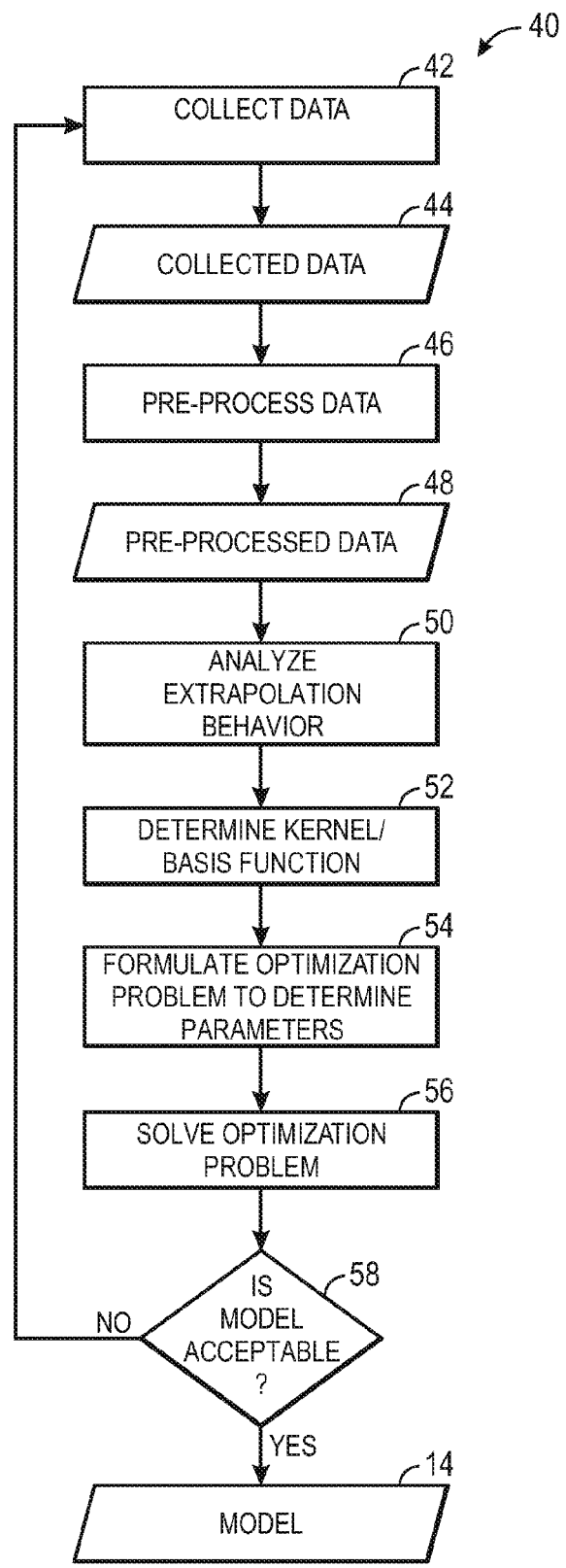
FIG. 3 is a flow diagram of an embodiment of logic, in accordance with one aspect of the disclosure.
Figure 5:
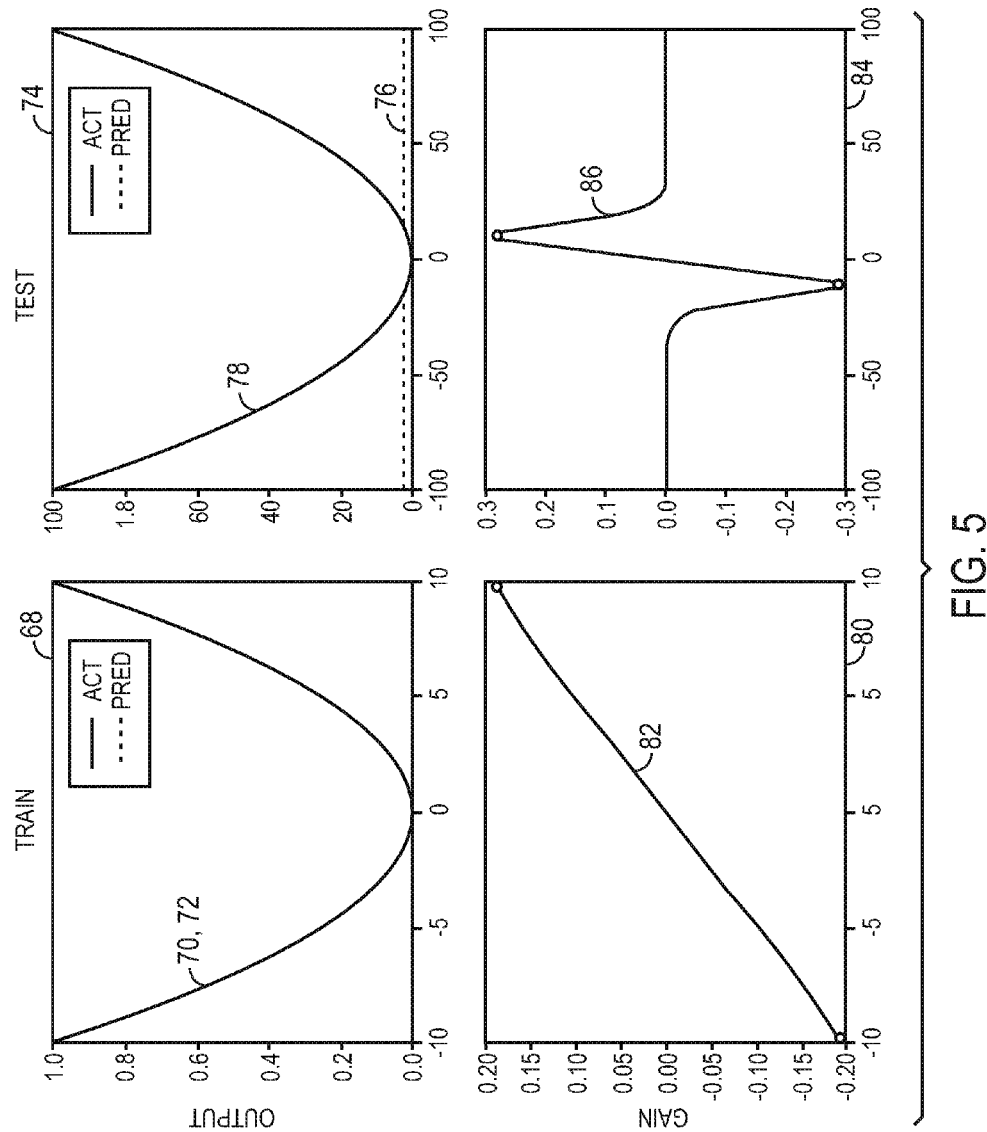
Figure 6:
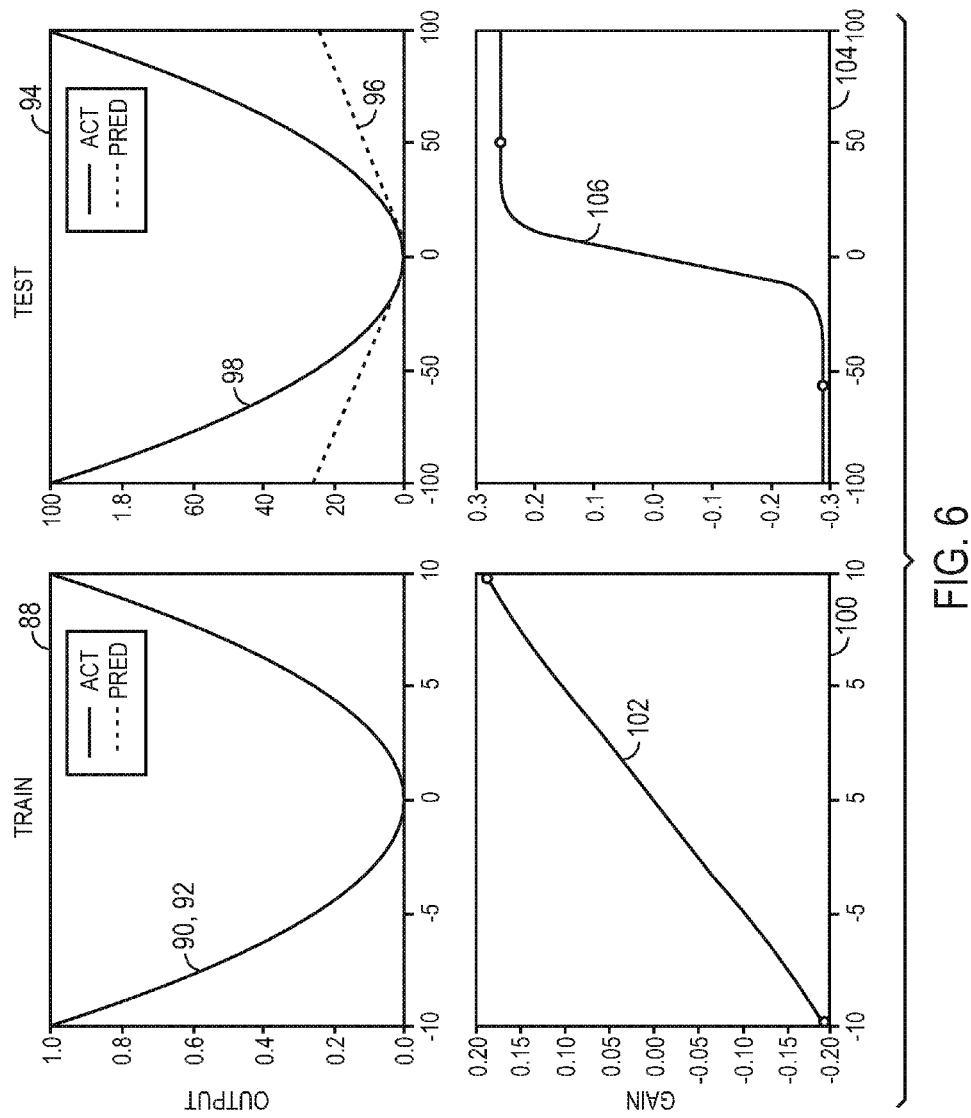
Figure 7:
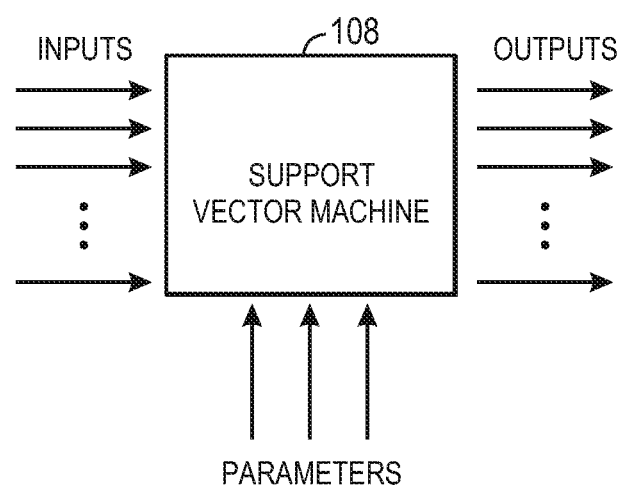

FIG. 5 includes graph diagrams of test and training results of a neural network, in accordance with one aspect of the disclosure;

FIG. 6 includes graph diagram of test and training results of the neural network of FIG. 3, in accordance with one aspect of the disclosure; and FIG. 7 is a block diagram of an exemplary support vector machine, in accordance with one aspect of the disclosure.

DETAILED DESCRIPTION

Figure 1:
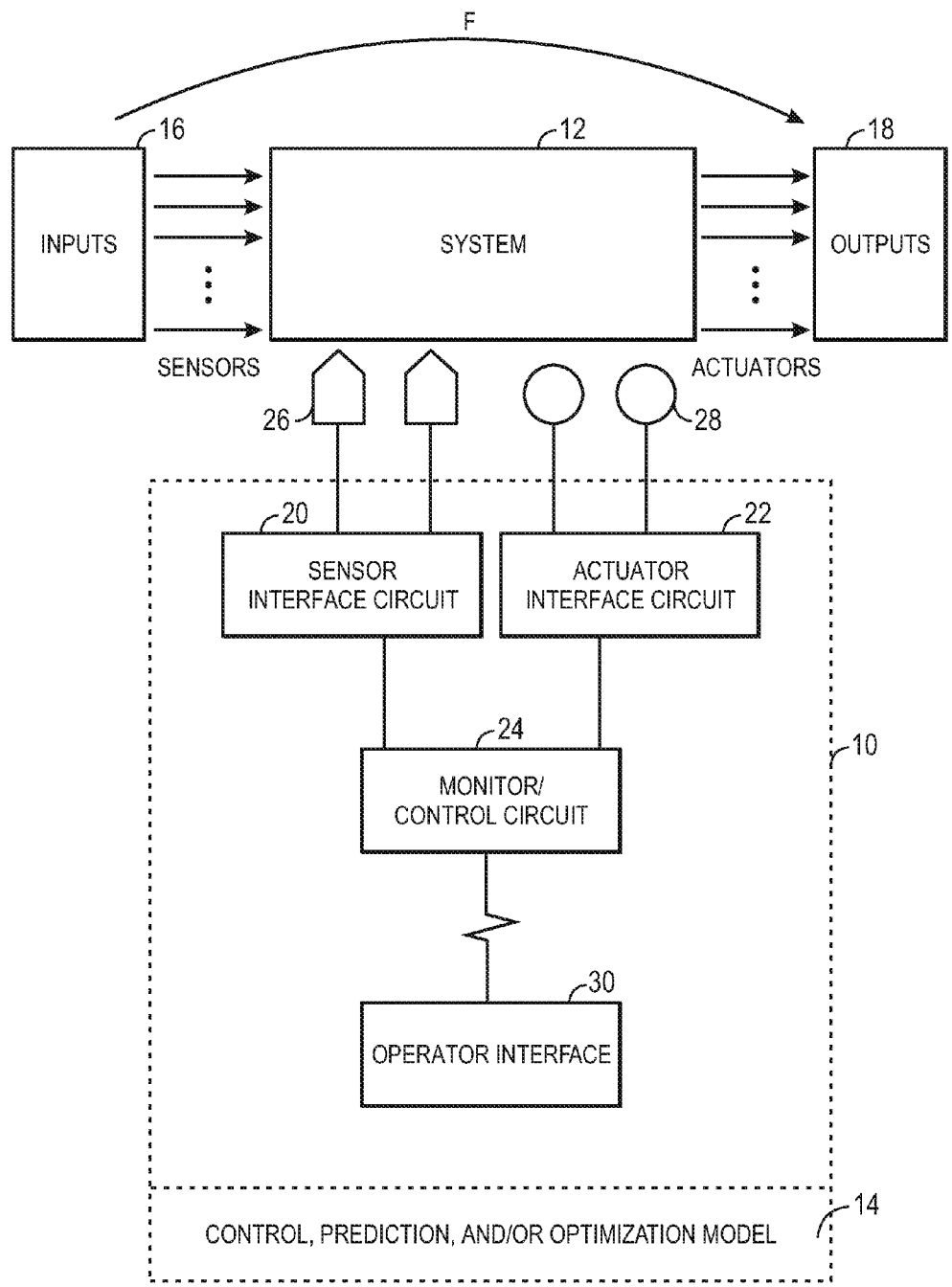
FIG. 1 is a block diagram a plant control, prediction and optimization system, in accordance with one aspect of the disclosure.

FIG. 1 illustrates an embodiment of an industrial controller 10 that is capable of controlling embodiments of a system 12. The system 12 may include a plurality of industrial system embodiments such as a manufacturing plant, an oil refinery, a chemical plant, a power generation facility, and others. The industrial controller 10 may include embodiments of an empirical model 14 capable of managing all aspects of the system 12, including control, prediction, and/or optimization. Indeed, the model 14 may be capable of control, prediction, and optimization of the system 12. For example, the model 14 may be capable of process control, quality control, energy use optimization (e.g., electricity use optimization, fuel use optimization), product mix management, financial optimization, and so forth.

The system 12 receives a set of inputs 16 and produces a set of outputs 18. The inputs 16 may include process inputs (e.g., types of materiel, quantities of materiel, product delivery schedules), financial inputs (e.g., accounting data, economic data), regulatory inputs (e.g., emission constraints, regulatory rules), and so forth. The outputs 18 may include manufactured products, refined products (chemicals, gasoline, coal), power (e.g., electricity), and so forth. Indeed, the system 12 is capable of receiving any number of inputs 16 and using the inputs 16 to produce a set of outputs 18.

In certain embodiments, the industrial controller 10 includes a sensor interface circuit 20, a actuator interface circuit 22, and a monitor/control circuit 24. The sensor interface circuit 20 is capable of communicating with a plurality of sensors 26. The sensors 26 may be capable of sensing a number of inputs 16 as well as signals internal to the system 12, such as temperature measurements, liquid levels, chemical composition, flow measurements, pressure measurements, electrical measurements, and so forth. Accordingly the sensors 26 may include temperature sensors, optical sensors, chemical sensors, pressure sensors, flow volume sensors, valve position sensors, speed sensors, vibration sensors, voltage sensors, amperage sensors, and so forth. Indeed, any type of sensing device may be used. The sensor interface circuit 20 may interface with the monitor/control circuit 24 so as to communicate measurements and other data based on the inputs 16 and on signals from the sensors 26. The monitor/control circuit 24 may then transform the inputted data into control signals suitable for use by the actuator interface circuit 22. The actuator interface circuit 22 may utilize a plurality of actuators 28 to perform any number of actions such as adjusting a valve position, moving a conveyor belt, controlling a robotic device, and so forth.

An operator interface 30 is communicatively connected with the monitor/control circuit 24 and used to aid an operator in interfacing with the monitor/control circuit 24. The operator interface 30 may be capable of programming the monitor/control circuit 24, modifying data, modifying the model 14, and so forth. In certain embodiments, the operator interface 30 may remotely located and may communicate through a network such as a local area network (LAN), the internet, or a wide area network (WAN). The operator interface 30 may also be capable of interacting with the model 14 in order to modify certain aspects of the model 14 as described in more detail below with respect to FIG. 2.

Figure 2:
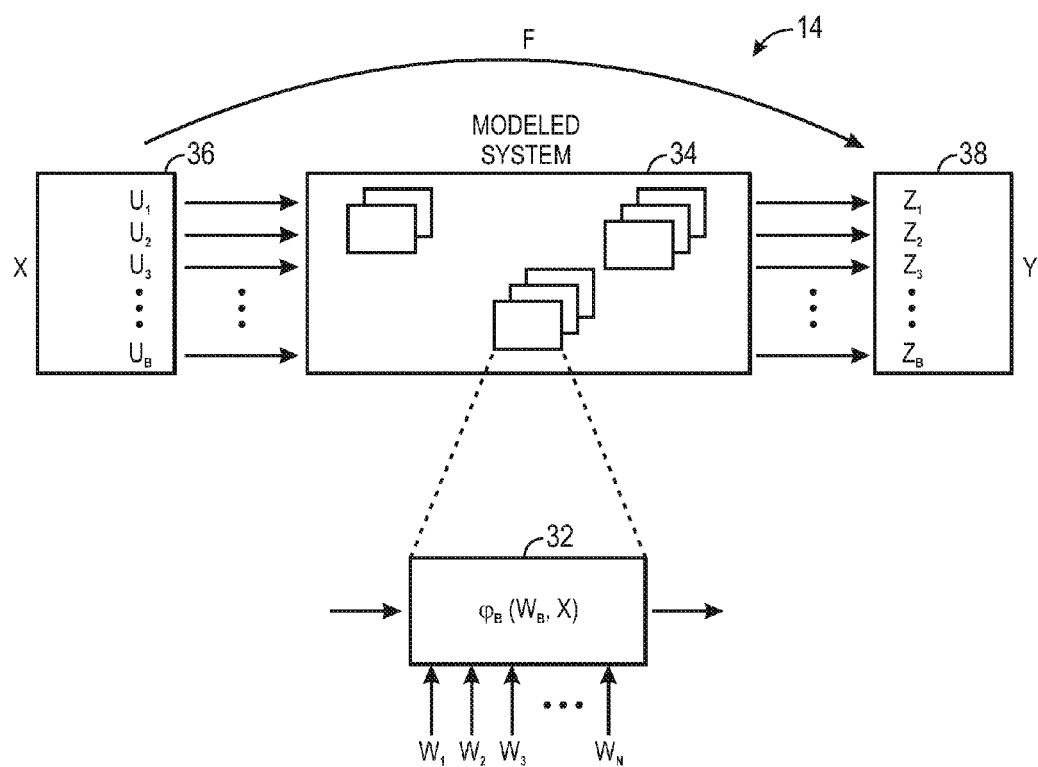
FIG. 2 is a block diagram of an embodiment of an empirical model, in accordance with one aspect of the disclosure.

FIG. 2 is a block diagram of the empirical model 14 capable of control, prediction, and/or optimization modalities. As mentioned above, the empirical model 14 is capable of modeling almost all aspects the systems 12. Accordingly, the model 14 includes a plurality of basis/kernel equations $\phi_b(w_b, x)$ 32 that may be used to describe a modeled system 34. Indeed, by using techniques described herein, including the equations $\phi_b(w_b, x)$ 32, the modeled system 34 may be suitable for modeling any number of systems 10. In certain embodiments, such as neural network embodiments, the equation $\phi_b(w_b, x)$ 32 may be used as a basis/kernel equation as described with more detail below with respect to FIG. 4. In other embodiments, such as support vector machine embodiments, the equation $\phi_b(w_b, x)$ 32 may be used as a kernel/basis function as described with more detail below with respect to FIG. 7. More generally, the equation $\phi_b(w_b, x)$ 32 may be used to express the empirical model 14 in the form $$f(x) = \sum_{b}^{N_B} \varphi_b(w_b, x),$$

as mentioned above, where $N_B$ is the number of the basis/kernel functions used for the approximation of the modeled system 34. A set of inputs x 36 where $x \in \mathbb{R}^{N_u}$ is the $N_u$-dimensional input vector, may be used as inputs into the modeled system 34. The modeled system 34 may then generate a plurality of outputs y 38 where $y \in \mathbb{R}^{N_z}$ is the $N_y$-dimensional output space.

The equation $\phi_b(w_b,x)$ 32 may include parameters $w_b$ that are determined in the course of the modeling process. For example, parameters $w_b$ may be incorporated corresponding to weights of links between nodes, biases of nodes, tuning factors, and so forth. In certain embodiments, a method for modeling includes determining the model parameters $w_b$ given the available data and any knowledge about the modeled system 34. Indeed, such embodiments are capable of making the analysis of the extrapolation properties of the empirical model 14 an integral part of the selection of the basis/kernel function $\phi_b(\bullet)$. In these embodiments, an asymptotic behavior of the system 10 may be known or desired. That is, the detailed behavior of the system may not be known, but the more general asymptotic behavior may be known, or if not known, a certain asymptotic behavior may be desired. Accordingly, a basis/kernel function $\phi_b(\bullet)$ may be selected for use as equation $\phi_b(w_b,x)$ 32 such that the asymptotic behavior of the modeled system 34 matches that of the actual system 10. Some example asymptotic behaviors and corresponding exemplary basis/kernel functions are described below.

For constant asymptotic behavior where $\phi_b(x) \sim c$:

$$\phi_b(x) = 1/(1+\exp(-x)); \quad (6)$$

$$\phi_b(x) = \tan h(x); \quad (7)$$

$$\phi_b(x) = x/\sqrt{(1+x^2)}; \quad (8)$$

$$\phi_b(x) = x/(1+|x|). \quad (9)$$

For linear asymptotic behavior where $\phi_b(x) \sim x$:

$$\phi_b(x) = \log(1+\exp(x)). \quad (10)$$

For logarithmic asymptotic behavior where $\phi_b(x) \sim \log(x)$:

$$\phi_b(x) = \log(1+x^2); \quad (11)$$

$$\phi_b(x) = \log(\sqrt{1+x^2}). \quad (12)$$

For quadratic asymptotic behavior where $\phi_b(x) \sim x^2$:

$$\phi_b(x) = \log(1+\exp(x^2)); \quad (13)$$

$$\phi_b(x) = \log^2(1+\exp(x)). \quad (14)$$

For exponential asymptotic behavior where $\phi_b(x) \sim \exp(x)$:

$$\phi_b(x) = \exp(x); \quad (15)$$

$$\phi_b(x) = \sin h(x). \quad (16)$$

For quasi-periodical asymptotic behavior where $\phi_b(x) \sim \sin(x)$:

$$\phi_b(x) = \sin(x). \quad (17)$$

By incorporating the asymptotic behavior of the system 10, the resulting modeled system 34 may be capable of a substantially improved extrapolation behavior, including the ability to more closely model the actual system 10.

FIG. 3 is a flow chart depicting a logic 40 that may be used to define the model 14. The logic 40 may collect (block 42) a data 44. The data 44 may include sensor 26 data, actuator 28 data, system inputs 16, and/or any data suitable for observing the behavior of the actual system 10. The data collection (block 42) may be automated, that is, the data may be logged into a system through a data logger, extracted from existing databases, submitted from an external source, and so forth. The data collection (block 42) may also be manual, that is, an operator may enter certain data points of interest. Indeed, any number of data collection systems and methodologies may be used.

The collected data 44 may then be pre-processed (block 46) so as to render the collected data 44 more useful for empirical modeling. For example, a filter such as a low-pass filter may be utilized to filter noise out of the collected data. In another example, correlated data may be removed. Removing correlated data may be useful in facilitating clusterability and discrimination in the data. The process data 44 may also be pre-processed (block 44) so as to place the data 44 in a common time scale. The data 44 may also be normalized during pre-processing (block 46), for example, by scaling the data 44 into a numeric range appropriate for use by the model 14. Accordingly, the data 44 may thus be transformed into a pre-processed data 48.

The pre-processed data 48 may then be utilized as part of an analysis of the extrapolation behavior of the system 10. The extrapolation behavior may use knowledge available about the system 10 to determine the extrapolation behavior of the system 10. In one example, the pre-processed data 48 may be analyzed and used to determine any asymptotic tendencies of the system 10. For example, techniques such as linear regression (e.g., least squares, adaptive estimation, and ridge regression), the method of dominant balance (MDB), and/or others may be used. Indeed, any number of methods useful in the asymptotic analysis of the system 10 may be employed. In cases where the asymptotic behavior of the system is not known, then a desired asymptotic behavior may be used. For example, a linear behavior may suitably control a heating process, while a constant behavior may suitably control a mixing process. Accordingly, an extrapolation behavior 50 may be found or defined.

The basis/kernel function $\phi_b(\bullet)$ capable of rendering the extrapolation behavior 50 may be selected (block 52). As mentioned above, any number of equations may be used to define the basis/kernel function $\phi_b(\bullet)$, including equations 6-17. Indeed, by incorporating the extrapolation behavior of the system 10 into the selection of the basis/kernel function $\phi_b(\bullet)$, the modeled system 34 may be capable of more closely modeling the actual system 10 (i.e., exhibiting higher fidelity). Once the basis/kernel function $\phi_b(\bullet)$ has been selected (block 52), the logic 40 may then formulate an optimization problem to determine the model's parameters (block 54). The optimization problem may be formulated based on for example, on the modeling goals (e.g., reducing the modeling error), system constraints (e.g., demonstrating a desired asymptotic behavior), and so forth.

The logic 40 may then solve the optimization process to determine the model's parameters (block 56). In certain embodiments, this training process may employ a gradient descent method. In gradient descent, one takes steps proportional to the negative of the gradient of the optimization function at its current point. The function may typically decrease fastest if one moves in a gradient towards a local minimum. Accordingly, the gradient descent may find the local minima through the stepwise moves. The set of model parameters $w_b$ may thus be ascertained. The logic 40 may then analyze the resulting model 14 to determine if the resulting model 14 is acceptable (decision 58). In certain embodiments, the acceptability of the model may depend on the model's accuracy, the model's high-order behavior (e.g., gain or second order derivatives), and the model's extrapolation properties. In these embodiments, a test data may be used as inputs to the model 14, and the outputs of the model may then be analyzed to see if they are adequate. For example, the outputs may be analyzed to see if control embodiments of the model 14 adequately respond to the test data by issuing appropriate control signals. Similarly, predictive embodiments of the model 14 may use the test data as inputs of, for example, a simulation, and the simulation results may be studied to verify the quality of the simulation. Likewise, a optimization modalities of the model 14 may use the test data as inputs to optimization embodiments of the model 14 and the outputs of the optimization embodiments may be analyzed to determine their suitability to accurately optimize certain aspects of the system 10 such as cost, production outputs, power generation, and so forth. If the model 14 is deemed not suitable for use, then the logic 40 may loop to block 42 to repeat the model's training process. Indeed, the model 14 may be iteratively trained so as to achieve an accuracy, a high-order behavior, and extrapolation properties suitable for modeling the system 10. The model 14 may include neural network and/or support vector machine embodiments capable of employing the techniques described herein, including asymptotic analysis techniques, capable of superior extrapolation properties that may be especially useful in control, prediction, and optimization applications.

Figure 4:
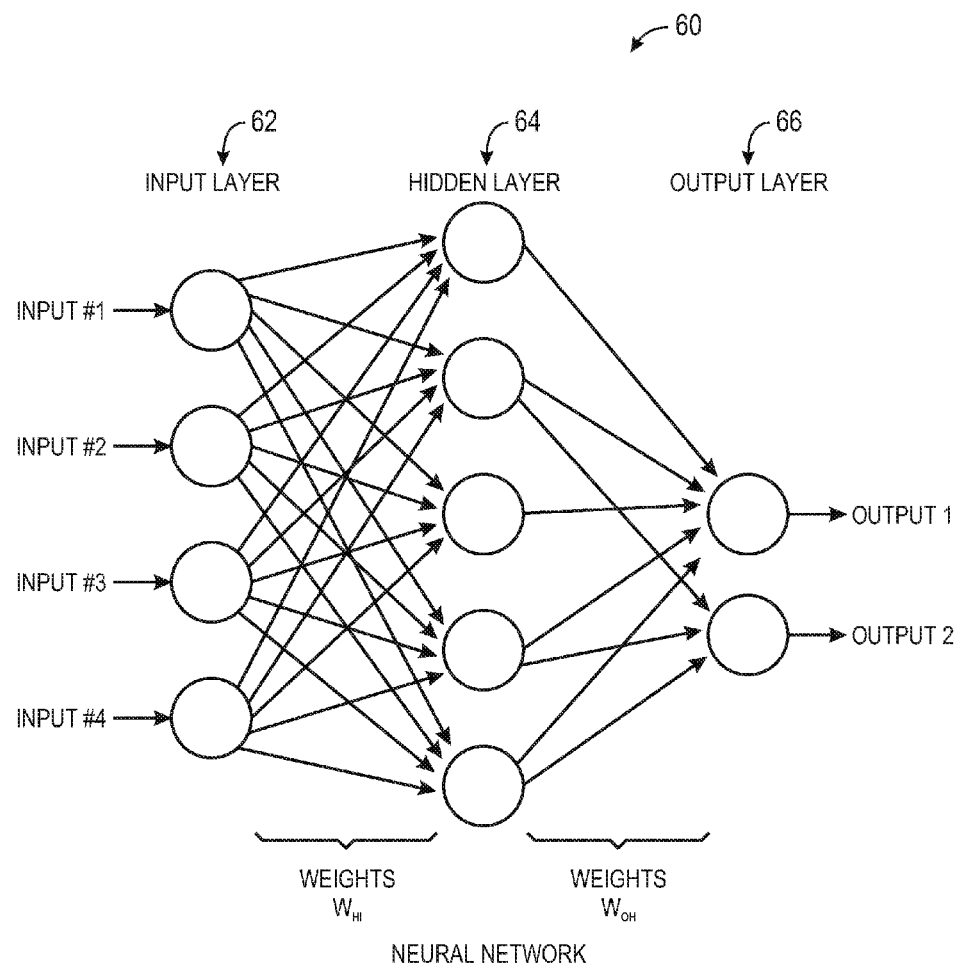
FIG. 4 is a diagram of an exemplary embodiment of a neural network, in accordance with one aspect of the disclosure.

FIG. 4 depicts an embodiment of a neural network 60 capable of employing the techniques described herein. More specifically, the illustrated neural network may be trained by using the logic 40 as described above with respect to FIG. 3 to incorporate asymptotic analysis. In the illustrated embodiment, the neural network includes a plurality of input nodes (i.e., input layer) 62, a plurality of hidden nodes (i.e., hidden layer) 64, and multiple output nodes (i.e., output layer) 66. Accordingly, the neural network 60 is a multi-layer, feed-forward network with linear outputs having a single hidden layer 64. It is to be understood that while the depicted embodiment illustrates a specific neural network architecture, other architectures having more or less nodes as well as having more than one hidden layer may be used. Indeed, the techniques herein may be incorporated in any number of neural network architectures.

In the illustrated embodiment, let i, h, and o denote the indexes of the nodes in the input layer 62, hidden layer 64, and output layer 66 respectively. Weights between output and hidden nodes are denoted by $w_{oh}$ and weights between hidden and input nodes are denoted by $w_{hi}$. Biases of the hidden and output nodes are b$_h$ and b$_o$ respectively. For the hidden nodes, u$_h$ is the weighted sum input, $f(\bullet)$ is the transfer function, and z$_h$ is the output of the hidden nodes. The variable y$_o$ is the o-th component of the multi-output process $f(\bullet)$. Accordingly, the equations below represent the inputs u$_h$, hidden layer output z$_h$, and the o-th component of $f(\bullet)$:

$$u_h = \sum_i (w_{hi} x_i) + b_h; \qquad (18)$$

$$z_h = f(u_h); \qquad (19)$$

$$y_o = \sum_h (w_{oh} z_h) + b_o. \qquad (20)$$

The o-th component of the multi-output process $f(\bullet)$ may be expressed so as to incorporate the more generic $\phi(\bullet)$ as follows:

$$y_o = \sum_h \overbrace{\left[ w_{oh} \cdot f\left( \sum_i (w_{hi} x_i) + b_h \right) + b_o \right]}^{\varphi_{o,h}(\cdot)} \qquad (21)$$

where $\phi_{o,h}(\bullet)$ is the o-th component of the basis/kernel function of the neural network 60, and h is the index that varies over the nodes in the hidden layer 64. As mentioned above, the higher-order behaviors, such as the sensitivity (i.e., gain) of the model 14 may be useful in certain embodiments such as control embodiments. Accordingly, the sensitivity $$\frac{dy_o}{dx_i}$$

or the gain K$_{oi}$ of the output y$_o$ with respect to the input can be derived as follows:

$$K_{oi} = \frac{dy_o}{dx_i} = \sum_h w_{oh} w_{hi} f'(u_h) = \sum_h w_{ohi} * f'(u_h). \qquad (22)$$

where $f'(u_h)$ is the derivative of the transfer function $f(u_h)$ and the product $w_{oh} w_{hi} = w_{ohi}$ is used to emphasize that the gain of a network is a weighted sum of the derivative of its hidden nodes. Sigmoidal functions (e.g., S-shaped functions) such as $f(x)=1/(1+\exp(-x))$ or $f(x)=\tan h(x)$ may be used as activation functions for the neural network 60. However, the emphasis given has not been the asymptotic behavior of the neural network but rather on the quality of the neural network's 60 fit over the training data. Indeed, in other approaches, the architecture of the neural network 60 may have to be modified extensively, for example, by adding additional hidden layers 64, in order to arrive at a neural network 60 that may exhibit improved extrapolation behaviors. By way of contrast, the techniques disclosed herein allow for the use of a single hidden layer 64. By incorporating the extrapolation properties of a node as a deciding factor in the selection of the activation functions, and by using exemplary non-sigmoidal activation functions $f(x)=1/(1+\exp(x))$ or $f(x)=1/(1+\exp(x^2))$, the neural network 60 may be trained by so as to result in embodiments that overcome the zero model gain and gain inversion problems. In certain embodiments, the neural network 60 may be trained by using the logic 40 of FIG. 3.

Sigmoidal functions may be used in neural networks because of their ability to fit the training data well. However, sigmoidal functions are monotonic and bounded. The derivatives of the sigmoidal functions are also bounded, with the gain assuming its maximum when input is at zero and decreasing towards zero as the input moves away from zero. As a consequence, the neural network gain (i.e., the weighted sum of the sigmoidal function's derivative), also trends to zero as the input moves away from zero. While such behavior may work well in applications that require bounded outputs, other applications such as control applications, typically avoid zero gains. For applications where zero and small gains are to be avoided, a choice of transfer function (i.e., activation function) for the neural network 60 would be as follows:

$$f(u) = \log(1 + \exp(u)) \Rightarrow \left\{ \begin{array}{l} u \to -\infty \text{ then } f(u) \to 0 \\ u \to +\infty \text{ then } f(u) \to u \end{array} \right\}. \qquad (23)$$

The gain equations will be as follows:

$$f'(u) = 1/(1 + \exp(-u)) \Rightarrow \left\{ \begin{array}{l} u \to -\infty \text{ then } f'(u) \to 0 \\ u \to +\infty \text{ then } f'(u) \to 1 \end{array} \right\}. \qquad (24)$$

The activation function in equation 23 is a monotonic but unbounded function whose derivative, equation 24 is also monotonic and bounded in [0, 1]. Consequently, the neural network 60 utilizing such functions will be monotonic with bounded overall gain:

$$K_{oi}^{min} \leq \left(\sum_h w_{ohi} * f'(u_h)\right) \leq K_{oi}^{max}. \quad (25)$$

$K_{oi}^{min}$ and $K_{oi}^{max}$ can be determined by the user and enforce during training by identifying the suitable gain bounds for the system 10 being modeled. Indeed, the bounded gain can be expressed in terms of the hidden node layer 64. The hidden node layer 64 may be divided into two groups, $h_p$ for hidden nodes with $w_h = w_{oh} w_{hi} \geq 0$ and $h_n$ for the hidden nodes with $w_h = w_{oh} w_{hi} < 0$. With $0 \leq f'(\cdot) \leq 1$ for all input values, the gain bounds on $K_{oi}$ may be obtained as follows:

$$\max(K_{oi}) \leq \sum_{hp} w_{oh} w_{hi}; \quad (26)$$

$$\min(K_{oi}) \geq \sum_{hn} w_{oh} w_{hi}. \quad (27)$$

The upper and lower bounds of equations 26 and 27 are valid for all inputs. However, it may be possible for the gain bounds not to be tight, that is, some gain may be far from the bounds. However, by analyzing the asymptotic gain for the neural network 60, one can derive $K_{oi}^+$ for $x_i \to \infty$ and $K_{oi}^-$ for $x_i \to \infty$ as follows:

$$K_{oi}^+ = \sum_{hip} w_{oh} w_{hi}; \quad (28)$$

$$K_{oi}^- = \sum_{hin} w_{oh} w_{hi}; \quad (29)$$

where hip are the nodes in the hidden layer 64 with $w_{hi} \geq 0$ and hin are the nodes in the hidden layer with $w_{hi} < 0$. Accordingly, this asymptotic analysis allows the training of the neural network as described above with respect to FIG. 3 where the following optimization problem may be solved:

$$\begin{cases} \min w_{hi}, b_h, w_{oh}, b_o \quad \sum_d L(y_d - y_o) \\ \text{subject to:} \quad \text{Eq. (18-20)} \\ \quad K_{oi}^{min} \leq \left(K_{oi} = \sum_h w_{ohi} f'(u_h)\right) \leq K_{oi}^{max} \end{cases} \quad (30)$$

where $w_{hi}$, $b_h$, $w_{ho}$, $b_o$ are the neural network parameters, d indexes over the data points, $L(\cdot)$ is any appropriate loss function as a 1-norm, 2-norm, or ∞-norm, and $K_{oi}$ is the neural network gain to be bounded between known and/or desired gain constraints $K_{oi}^{min}$ and $K_{oi}^{max}$. Indeed, the neural network 60 created and trained by using this techniques may be capable of improved extrapolation properties, including the avoidance of gain trending towards zero as well as gain inversion.

Further, the neural network 60 may be capable of using unscaled input/output variables after training. As mentioned above, scaling may be used during training to pre-process the raw data. Once neural network 60 has been architected and trained, raw inputs are typically scaled to conform with the scaling performed during training. Similarly, outputs are scaled to conform, for example, to actual engineering units. In certain embodiments, it may be possible to avoid the scaling of inputs and outputs after training. Indeed, in these embodiments, the neural network 60 may be capable of transforming the trained weights and biases such that the neural network 60 may use raw variables in engineering units directly.

As described above, the neural network 60 is a multi-layer, feed-forward neural network with one hidden layer 64 and linear output nodes 66. Let the subscripts i, h, and o index the nodes in the input layer 62, hidden layer 64, and output layer 66 respectively. If upper case names denote unscaled variables (e.g., raw or engineering units), while lower case names denote scaled variables, $X_i/x_i$ denotes the unscaled/scaled inputs, and $Y_o/y_o$ denotes the unscaled/scaled outputs. Weights between output and hidden nodes are denoted by $w_{oh}$ and weights between hidden and input nodes are denoted by $w_{hi}$. Biases of the hidden and output nodes are $b_h$ and $b_o$ respectively. For the hidden nodes, $u_h$ is the weighted sum input, $f(\cdot)$ is the transfer function, and $z_h$ is the output of the hidden nodes. For training purposes, the input and output data may be scaled and translated as follows:

$$x_i = S_i X_i + T_i; \quad (31)$$

$$y_o = S_o X_o + T_o. \quad (32)$$

The network values are given by equations 14-16 above. After training, rather than incurring a time and resource penalty to scale and unscale data points during run time, it may be more efficient to rescale the neural network 60 and then use the raw data directly during run time. The exemplary equations used for scaling the weights and biases after training in terms of the data scaling used during training are as follows:

$$u_h = \sum_i (w_{hi} x_i) + b_h; \quad (33)$$

$$= \sum_i [w_{hi}(S_i X_i + T_i)] + b_h; \quad (34)$$

$$= \sum_i (w_{hi} S_i X_i) + \sum_i (w_{hi} T_i) + b_h; \quad (35)$$

$$= \sum_i (W_{hi} X_i) + B_h; \quad (36)$$

where $$W_{hi} = w_{hi} S_i; \text{ and} \quad (37)$$

$$B_h = \sum_i (w_{hi} T_i) + b_h. \quad (38)$$

Similarly, $$y_o = \sum_h (w_{oh} z_h) + b_o; \quad (39)$$

$$S_o * Y_o + T_o = \sum_h (w_{oh} z_h) + b_o; \quad (40)$$

$$Y_o = \sum_h [(w_{oh}/S_o) z_h] + (b_o - T_o)/S_o; \text{ and} \quad (41)$$

$$Y_o = \sum_h (W_{oh} z_h) + B_o; \quad (42)$$

-continued where $$W_{oh} = \frac{w_{oh}}{S_o}; \qquad (43)$$

$$B_o = \frac{(b_o - T_o)}{S_o}. \qquad (44)$$

Indeed, while the original neural network having parameters $w_{hi}$, $b_h$, $w_{ho}$, and, $b_o$ maps the scaled inputs $x_i$ to the scale outputs $y_o$, the transformed neural network 60 having parameters $W_{hi}$, $B_h$, $W_{ho}$, and $B_o$ maps the raw inputs $X_i$ to the raw outputs $Y_o$. Such mapping may be capable of improved speed during run time of the model 14 as well as improved use of resources such as processing cycles and memory. By incorporating the techniques described herein, including activation functions that have been selected due to their asymptotic properties, the neural network 60 embodiments may be capable of enhanced extrapolation behaviors, such as those described in FIG. 6, and improved run time performance.

FIGS. 5 and 6 illustrate the results of utilizing the activation functions $f(x)=\tan h(x)$ and $f(x)=1/(1+\exp(x))$, respectively. In FIGS. 5 and 6, the data is generated by the equation data=$0.01*x^2$. That is, the system 10 is being modeled as a polynomial so as to test the ability of the neural networks to predict the resulting output. FIG. 5 shows the results of a neural network that does not incorporate the techniques described herein. Graph 68 of FIG. 5 shows the output of the trained neural network over a training data where the training data has been restricted to an ordinate range [0.0, 1.0] and an abscissa range [−10, 10]. The neural network adequately predicts the outputs of the system 10 over the training data. Indeed, graph 68 shows that the neural network fits the trained data very precisely. That is, the predicted output 70 fits over the training output 72. Neural networks are known to exhibit universal approximation properties over their training data. In other words, the neural network may be designed and/or trained to fit the quadratic training data to any desired degree of accuracy. However, traditional neural networks may not extrapolate well outside of the training data. Graph 74 shows the predictive deficiencies of the neural network over a test data set. The test data set includes an ordinate range [0, 100] and an abscissa range [−100, 100]. The neural network not utilizing the techniques described herein incorrectly predicts an asymptotically flat output 76 whereas the actual output should be the curve 78.

The higher order behaviors of the neural network are illustrated in graph 80. As expected, the gain shows a well defined, increasing gain profile 82 over the training data. By way of contrast, graph 84 shows a gain profile 86 that trends to zero gain outside of a narrow training band. Such zero trending behavior would be detrimental if used in, for example, controller embodiments. Indeed, such zero trending behavior may result in infinite controller gains.

FIG. 6 shows the results of a neural network 60 that incorporates the techniques described herein, including the use of asymptotic analysis to choose a non-sigmoidal activation function $f(x)=1/(1+\exp(x))$. Graph 88 depicts the output of the trained neural network 60 over the training data where, as described above, the training data has been restricted to an ordinate range [0.0, 1.0] and an abscissa range [−10, 10]. The neural network 60 also adequately predicts the outputs of the system 10 over the training data. Indeed, graph 88 shows that the predicted output 90 fits the actual output 92 very precisely. Moreover, graph 94 shows that behavior of the trained neural network 60 over the test data, where the test data also consist of the ordinate range [0, 100] and the abscissa range [−100, 100]. It is clear that the predicted output 96 is no longer flat and that the predictive output 96 shows asymptotic trending of the activation function. Further, the trained neural network 60 shows a much improved extrapolation behavior not only over the predicted output but also over higher order properties of the neural network 60.

Graph 100 shows a gain profile 102 of the trained neural network 60 over the training data. The gain profile 102 is similar to the gain profile 82 in that the gain profile 102 is well defined, and not trending to zero. Further, graph 104 illustrates a much improved gain profile 106 over the test data. As illustrated, the gain profile 106 is also better defined and no longer trending towards zero. Accordingly, the neural network 60 incorporating techniques such as asymptotic analysis and use of unscaled data may be substantially more useful in, for example, control embodiments. Indeed, such techniques may be useful in other embodiments such as support vector machines.

FIG. 7 illustrates and embodiment of a support vector machine (SVM) 108. SVMs, like neural networks, may be architected and/or trained on a set of data so as to achieve universal approximator properties. Accordingly, the SVM 108 may be included in the model 14. A linear or nonlinear system f(x) may be approximated using the SVM 108 as follows:

$$f(x) = w^T \phi(x) + b. \qquad (45)$$

The equation 45 may be deemed the primal equation for the approximation of f(x), where w and b are the weight and basis coefficients, respectively, and $\phi(x)$ is the primal kernel function used for the approximation. Given N set of input/output measurements, the approximation error $f(x) - (w^T \phi(x) + b)$ may be captured with various loss functions. In one embodiment, the loss function is as follows:

$$\min_{[w,b,\zeta^+,\zeta^-]} \mathcal{J}(w, b, \zeta^+, \zeta^-) = \frac{1}{2} w^T w + c \sum_{k=1}^{N} \{\zeta_k^+ + \zeta_k^-\}; \qquad (46)$$

subject to:

$$\begin{cases} f(x_k) - \left[ w^T \phi(x_k) + b \right] \leq \zeta_k^+ + \varepsilon, \zeta_k^+ \geq 0, \text{ for } k = 1, \ldots N \\ -f(x_k) + \left[ w^T \phi(u_k) + b \right] \leq \zeta_k^+ + \varepsilon, \zeta_k^- \geq 0, \text{ for } k = 1, \ldots N \end{cases}. \qquad (47)$$

The constrained optimization problem described in equations 46 and 47 above may be deemed the primal problem. The primal problem may use a preselected basis/kernel function $\phi$, to yield the w and b coefficients. Additionally, the constant c of equation 46 may be a positive real constant and may be used as a tuning parameter. $\varepsilon$ is the desired accuracy level, and $\zeta_k^+$, $\zeta_k^-$ are slack variables.

In another embodiment, the optimization problem may be defined as follows:

$$\max_{[\infty,\infty^*]} Q(\infty, \infty^*) = -\frac{1}{2} \sum_{k,l=1}^{N} (\alpha_k - \alpha_k^*)(\alpha_l - \alpha_l^*) K(x_k, x_l); \qquad (48)$$

$$= -\varepsilon \sum_{k=1}^{N} (\alpha_k + \alpha_k^*) + \sum_{k=1}^{N} f(x_k)(\alpha_k - \alpha_k^*); \qquad (49)$$

subject to $$\left\{ \begin{array}{l} \sum_{k=1}^{N} (\alpha_k - \alpha_k^*) = 0 \\ \alpha_k, \alpha_k^* \in [0, c] \end{array} \right\}; \quad (50)$$

where $K(x_k, x_l) = \phi^T(x_k)\phi(x_l)$ is the basis/kernel function for the optimization problem, and $\alpha_k$ and $\alpha^*_k$ are Lagrange multipliers. Furthermore, the function f(x) may alternatively be defined as:

$$f(x) = \sum_{k,l=1}^{N} (\alpha_k - \alpha_k^*) K(x_k, x_l) + b. \quad (51)$$

An added advantage of the embodiment utilizing equations 48-51 is that the embodiment may be augmented with explicit constraints on the gain bounds on the SVM 108. Indeed, the asymptotic behavior of the basis/kernel functions may now be explicitly analyzed and incorporated into the SVM 108. The SVM 108 may then be optimized and the gain bounded by incorporating the final gains of the trained SVM 108 explicitly as a function of its inputs. The SVM 108 may be trained, for example, through the use of the logic 40 of FIG. 3. The gain's maximum and minimum may be found by solving an optimization problem with the gain as the objective function and the SVM 108 inputs as the decision variables. The inputs can be defined to a domain (e.g., train, test, unbounded) to obtain the precise maximum and minimum gains for the intended operating region. In one embodiment, the gain bounds may be formulated as hard constraints, as shown in equation 30. In another embodiment, the gain bounds may be formulated as penalty functions. Such enhanced capabilities allow the SVM 108 to exhibit superior extrapolation properties. It is to be noted that the techniques described with respect to the SVM 108 may also apply to other empirical modeling approaches such as neural networks.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a processor configured to execute non-transitory computer instructions comprising:
an empirical model wherein the empirical model is configured to receive inputs and to transform the inputs into outputs such that a first asymptotic behavior of the empirical model conforms to a desired second asymptotic behavior that is used to determine the empirical model, and wherein the empirical model is capable of control modalities, prediction modalities, optimization modalities, or a combination thereof; wherein the empirical model comprises a basis/kernel function configured to define the first asymptotic behavior and to maintain universal approximation properties of the empirical model, and wherein an asymptotic analysis utilizing the second asymptotic behavior is used to select the basis/kernel function.

2. The system of claim 1, wherein the basis/kernel function comprises a function $\phi_b(w_b, x)$, and wherein the processor is configured to determine $w_b$ during training and to determine a function f(x) based on the second asymptotic behavior.

3. The system of claim 2, wherein the empirical model comprises only $$f(x) = \sum_{b}^{N_B} \varphi_b(w_b, x)$$

and wherein $N_B$ comprises a number of basis/kernel functions $\phi_b(w_b, x)$.

4. The system of claim 2, wherein the basis/kernel function is a sigmoidal function, a non-sigmoidal function, or a combination thereof.

5. The system of claim 2, wherein the empirical model is a neural network.

6. The system of claim 2, wherein the empirical model is a support vector machine.

7. The system of claim 1, comprising an automation controller configured to control operations of a plant or a process, wherein the automation controller uses the empirical model to control the plant or the process, and wherein the inputs comprise sensor inputs and the outputs comprise actuator outputs.

8. The system of claim 1, wherein the inputs comprise production facility constraints, throughput limits, equipment efficiency, or a combination thereof, and wherein the outputs comprise reaction rates, process gains, process residence times, actuator settings, or a combination thereof.

9. The system of claim 5, wherein the neural network comprises a multi-layer, feed-forward neural network with linear outputs having only three layers.

10. The system of claim 9, wherein the neural network is capable of utilizing unscaled inputs, unscaled outputs, or a combination thereof.

11. The system of claim 1, wherein the empirical model comprises a gain, and wherein the gain is bounded.

12. The system of claim 11, wherein the gain does not trend towards zero, the gain does not invert, or a combination thereof.

13. A non-transitory tangible computer-readable medium comprising code adapted to:
implement an empirical model, wherein the empirical model is configured to receive inputs and to transform the inputs into outputs capable of control, prediction, and/or optimization modalities, and wherein an asymptotic analysis is used to define the empirical model, and wherein the empirical model comprises a basis/kernel function configured to define a first asymptotic behavior and to maintain universal approximation properties of the empirical model, and wherein the asymptotic analysis is configured to utilize a second asymptotic behavior to select the basis/kernel function.

14. The non-transitory tangible computer-readable medium of claim 13, wherein the wherein the basis/kernel function comprises a function $\phi_b(w_b, x)$ and wherein the processor is configured to determine $w_b$ during a training and to determine a function f(x) based on the second asymptotic behavior.

15. The non-transitory tangible computer-readable medium of claim 13, wherein the empirical model is implemented in a neural network, a support vector machine, or a combination thereof.

16. The non-transitory tangible computer-readable medium of claim 13, comprising code adapted to control operations of a plant or a process, wherein the code uses the empirical model to control the plant or the process, and wherein the inputs comprise sensor inputs and the outputs comprise actuator outputs.

17. A method for defining an empirical model comprising:
   collecting a data;
   pre-processing the data;
   analyzing the extrapolation behavior of a system to be modeled;
   determining a basis/kernel function based on the extrapolation analysis;
   formulating an optimization problem to determine a plurality of model parameters; and
   solving the optimization problem to define the empirical model, wherein the empirical model comprises the basis/kernel function configured to maintain universal approximation properties of the empirical model.

18. The method of claim 17, wherein the empirical model comprises a neural network, a support vector machine, or a combination thereof.

19. The method of claim 17, wherein the solving the optimization problem comprises determining a plurality of model parameters.

20. The method of claim 17, wherein the analyzing the extrapolation behavior comprises defining a first asymptotic behavior of the empirical model by observing a second asymptotic behavior of the system to be modeled.

* * * * *